June 13, 1933.  F. PURDY  1,913,684
THERMOPRESSURE HEAT CONTROL DEVICE
Filed Sept. 25, 1930   3 Sheets-Sheet 1
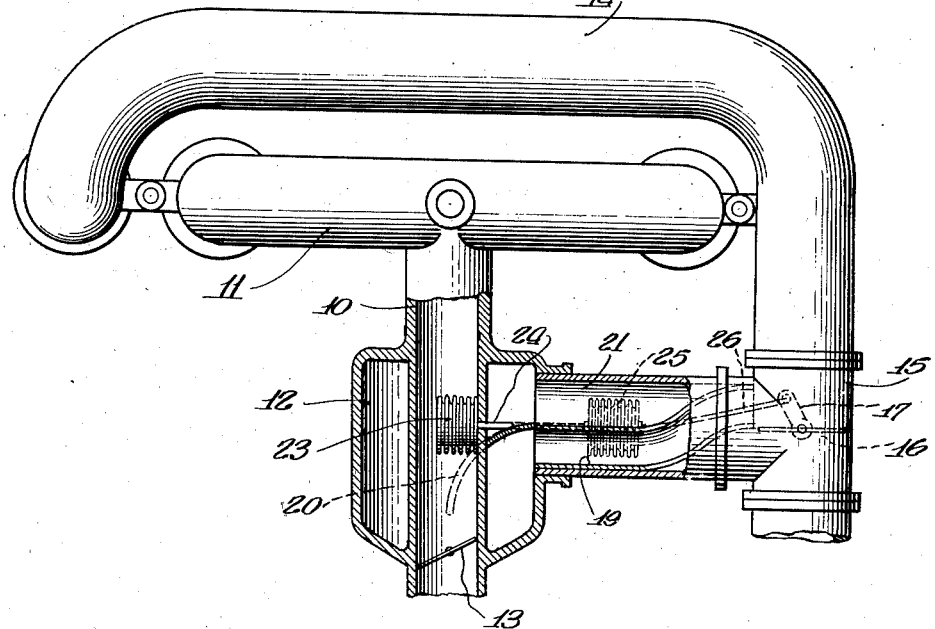
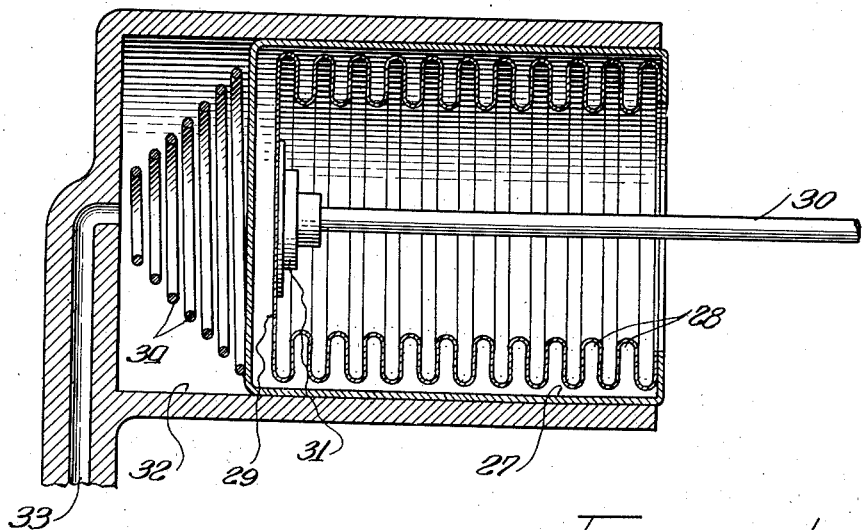
Inventor:
Frederick Purdy.

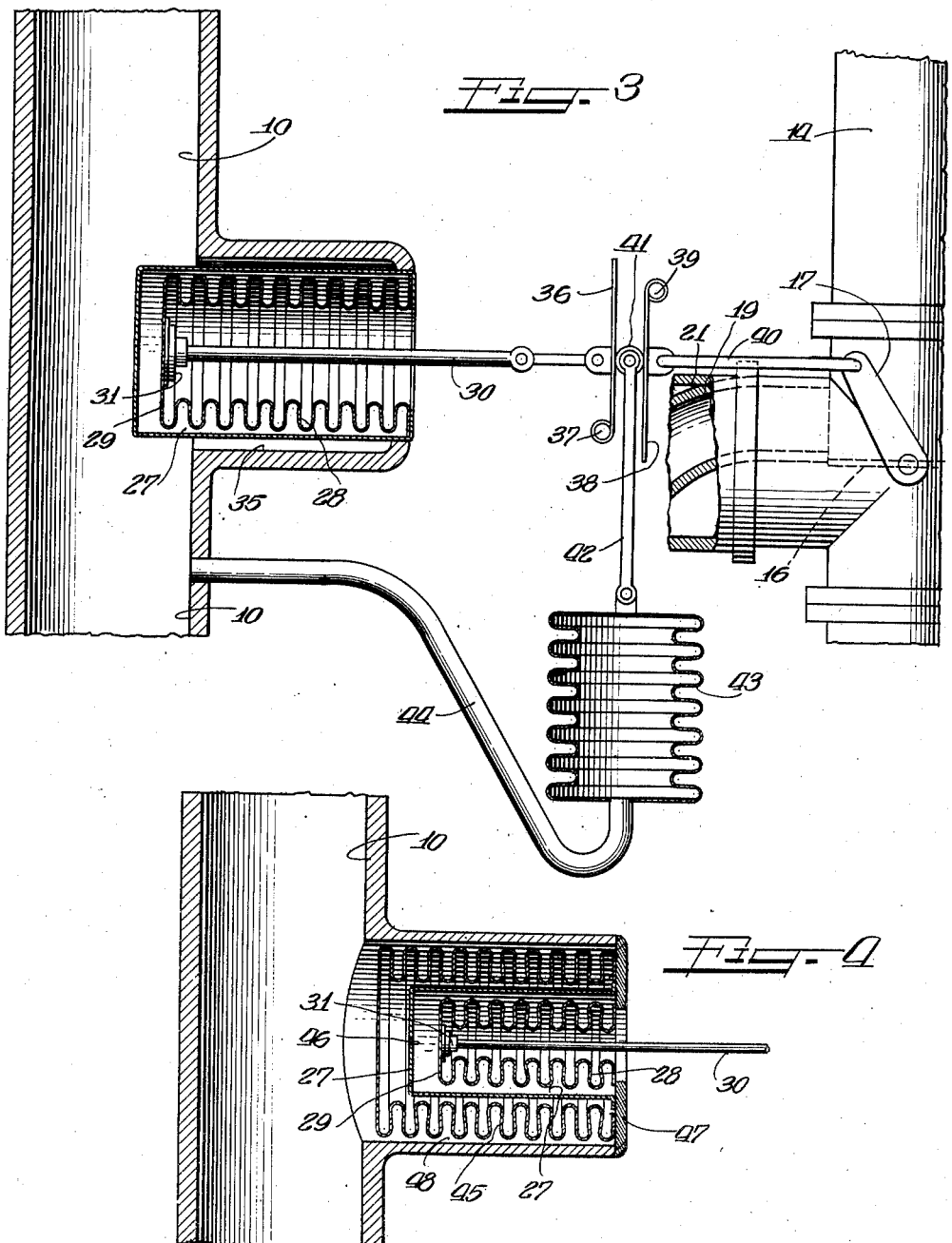

June 13, 1933.   F. PURDY   1,913,684
THERMOPRESSURE HEAT CONTROL DEVICE
Filed Sept. 25, 1930   3 Sheets-Sheet 3
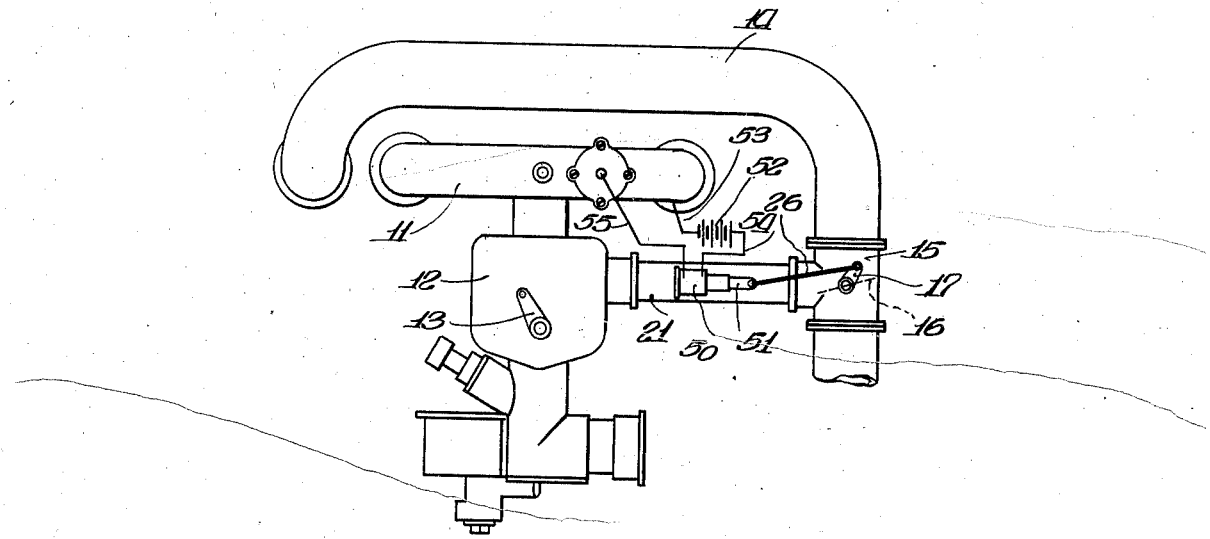
Inventor:
Frederick Purdy.
by: Charles W. Hills
Attys.

Patented June 13, 1933

1,913,684

UNITED STATES PATENT OFFICE

FREDERICK PURDY, OF FLINT, MICHIGAN, ASSIGNOR TO MARVEL CARBURETER COMPANY, OF FLINT, MICHIGAN, A CORPORATION OF ILLINOIS

THERMOPRESSURE HEAT CONTROL DEVICE

Application filed September 25, 1930. Serial No. 484,325.

This invention relates to improving the carburetion system of an internal combustion engine by improving the control of the heating system or hot spot commonly used to heat the intake mixture in the case of engines using liquid fuel.

One object of this invention is to provide a hot spot or heating jacket for the carburetion system in which the exhaust heat applied at the hot spot is thermostatically controlled to produce a predetermined variation in mixture temperature for the range between idling and full power operating conditions. Mixture temperature has a vital effect on engine performance. If the mixture temperature can be quickly raised to the desired point an engine will perform nicely long before its cooling water lubricating oil and radiator can be warmed up. If the mixture is too cold, too much of the fuel will be deposited on the walls of the manifold as a sluggish stream of liquid that cannot be uniformly distributed to the different cylinders. This will result in poor acceleration, poor economy, and inferior performance on the part of the engine. If the mixture is too hot the engine will lose in power, show an increased tendency to detonation, and be unduly sensitive to loading when a normal amount of accelerating fuel is supplied thereto. One of the difficulties which previous inventors have met with in attempts to produce a thermostat responsive to mixture temperatures has been in the fact that an engine requires a very different temperature for best operation at open throttle as compared to the temperature required for smooth idling or light load performance.

For open throttle work it is required that the engine produce the greatest possible power, and be capable of accelerating promptly and smoothly. To produce maximum power requires the lowest possible temperature consistent with satisfactory carburetion, and good acceleration usually requires some heat. With average fuel a temperature close to 100 degrees has been found satisfactory for full load work. Such a temperature is entirely too low for part throttle conditions as an attempt to operate at such temperatures would result in poor distribution and economy with a distinctly unsatisfactory engine performance. For such conditions a temperature rise to 150 degrees or more will be found to give satisfactory performance, but such a temperature would lead to loss of power and an unnecessary tendency towards detonation at full throttle.

It is a further object of this invention to provide a thermostatic heat control for the purposes described wherein the range of the thermostat is varied by changes in manifold suction corresponding to operating conditions between the extremes of idling and full power. In the several disclosed forms of the invention a thermostatic motor directly actuates a valve controlling the supply of heat to the hot spot or heating jacket, the thermostatic motor being so arranged that its effective responsiveness is varied by opposing suction responsive elements associated therewith.

It is another object of this invention to provide an improved and simplified direct acting heat control system for internal combustion engines wherein the heating effect is varied over a predetermined range in response to fluctuations in engine operating conditions.

Other and further important objects of this invention will be apparent from the disclosures in the specification and the accompanying drawings.

This invention (in a preferred form) is illustrated in the drawings and hereinafter more fully described.

On the drawings:

Figure 1 is an elevation partly in section of the manifolding system of an internal combustion engine, showing the application thereto of control mechanism illustrating one embodiment of this invention.

Figure 2 is a central section of the heat and suction responsive element of a second embodiment of this invention.

Figure 3 discloses a third embodiment of this invention wherein the suction control varies the effective leverage of the thermostatic control.

Figure 4 discloses a fourth modification of this invention wherein the suction and thermostatic elements interact to determine the movement of the heat control.

Figure 5 is an elevation of a manifold system embodying an electrically operated heat control system.

Figure 6 is a section through the temperature and pressure responsive device of Figure 5.

As shown on the drawings:

The various illustrated embodiments of this invention are intended to provide a direct and automatic control of heat supplied to a heating jacket or hot spot in the intake manifold system. An exhaust gas heated jacket is preferable for the purposes of this invention because of the quickness with which it heats up upon starting the engine. The particular form of exhaust heat control forms no part of this invention so that the particular arrangement chosen for illustration is not intended as a limitation of the invention for use therewith.

The manifolding system and heating system shown in Figure 1 is intended to apply to the other illustrated embodiments of the invention. A riser 10 supplies an intake manifold 11, the riser being provided with a jacket 12 the lower portion of which preferably envelops a throttle valve 13. An exhaust manifold 14 is provided with a heat control valve body 15 containing a heat control or diversion valve 16 movable by means of a lever 17. When the valve 16 is in a horizontal position it blocks the main exhaust passage and causes bypassing of the hot exhaust gases into a tube 19 leading to the jacket 12. The jacket is provided with a partition 20 which deflects the gases down around the location of the throttle, then up the left side of the jacket to a return tube 21 enveloping the supply tube 19, which tube 21 discharges into the valve body 15 below the valve 16. When the valve 16 is turned to its vertical position it permits an unrestricted straight through flow of the exhaust gases, so that the tubes and jacket will then form a dead pocket without a continued supply of hot gases thereto; since such flow is dependent upon a restriction of the main exhaust passage.

In the first embodiment of this invention, illustrated in Figure 1, a longitudinally expansible corrugated cylindrical sheath 23 is positioned in the intake passage or riser 10 and is connected by a tube 24 to a second similar cylindrical sheath 25 the left hand end of which is anchored while the right hand end is operatively connected to the valve lever 17 by a rod 26. The two sheaths 23 and 25 are filled or partly filled with a volatile liquid such as ether or other liquid vaporizing at a temperature approximating the desired lower temperature range for open throttle operation. The evaporation and expansion of the liquid sealed in the sheath 23, due to a temperature rise in the mixture flowing past said sheath, acts to expand both sheaths, the expansion of the second sheath 25 acting to rotate the valve 15 clockwise from the position shown to reduce or stop the diversion of exhaust gases through the heating jacket 12.

Since the first mentioned chamber 23 is positioned in the mixture passage in the riser, it is subjected to the pressure of the mixture. This pressure varies from nearly atmospheric under full throttle conditions to a suction of as much as 20 inches of mercury, or equivalent to nearly 10 pounds per square inch below atmospheric pressure. Since the diaphragm or corrugated cylindrical sheath is constructed to be expansible under increased internal pressure due to vaporization of the liquid therein, it is also expansible by an increase in suction in the surrounding mixture, the increase in suction acting to neutralize the effect of the first portion of a temperature rise otherwise sufficient to reduce or shut off the flow of exhaust gases through the jacket 12. This results in an increase in the effective temperature maintained by the thermostatic control under high suction conditions. The relative capacities of the two sheaths 23 and 25 and the heat control system determine the temperature range obtained in the mixture in accordance with variations in operating conditions evidenced by changes in manifold suction, low load conditions thus producing a higher normal temperature in the mixture.

In the second embodiment of this invention a thermostatic chamber is formed by a cup-like member 27 within which is sealed a corrugated expansible cylinder or sheath 28, the space between the cup and sheath being filled or partly filled with a thermostatically responsive fluid, the expansion of which fluid will tend to collapse the sheath moving the bottom 29 of the sheath outwardly or to the right in Figure 2. An operating rod 30 has a base 31 in contact with the bottom 29 of the sheath, the rod 30 being provided for the same purpose as the rod 26 operating the lever 17 as described in connection with the first embodiment of this invention.

The cup-like member 27 is slidably mounted in a cylinder 32 having a suction connection 33 to the manifold, a spring 34 serving to force the cup-like member or piston outwardly in opposition to the action of suction thereon so that a proper calibration of this spring will serve to determine the range of movement of the thermostatic assembly in response to suction fluctuations. A given movement of the cup-like member 27 to the left in response to increased manifold suction will nullify the thermostatic expansion of the sheath in response to a certain amount of temperature rise the result being that the heat control as a whole will maintain a higher mixture temperature at high suctions than under full throttle operating conditions.

A third embodiment of the invention utilizes the cup-like member 27, sheath 28 and rod 30 of the second form, but in this modification the cup-like member is fixed in a pocket 35 opening from the riser 10 or manifold 11 and is responsive only to temperature conditions within the manifold. The rod 30 is linked to a lever 36 pivoted at 37, a second lever 38 being pivoted at 39 and linked by a rod 40 to the valve lever 17. A roller 41 is interposed between the two levers 36 and 38 and serves to transmit motion therebetween. This roller 41 is linked by a rod 42 to a collapsible corrugated closed cylinder 43, having a suction connection 44 to the manifold, the high manifold suction acting to partially collapse the cylinder 43 thus drawing the roller downwardly in Figure 3. The downward movement of the roller brings it closer to the pivot 37 of the first lever 36 and consequently reduces the movement of the roller in response to movements of the rod 30 because of the reduction in leverage of the lever 36. At the same time the increased lever arm of the roller on the second lever 38 still further decreases the angular movement of the second lever, and consequently of the heat control valve 16, in response to the expansion produced by a given temperature rise in the thermostatically responsive unit. Thus an increase in manifold suction will result in a decrease in the responsiveness of the heat control valve which in turn will require a higher manifold temperature to reduce the diversion of exhaust gases to the heating jacket.

The fourth embodiment of the invention also utilizes the cup-like member 27 and sheath 28 inside thereof together with the operating rod 30 which is intended to be connected to the valve lever 17. In this form of the invention a second expansible sheath 45 is applied outside the cup-like member 27 and the thermostatic liquid in the case has access to both surfaces of the cup-like member through a port 46 in the bottom thereof. The two sheaths and the intermediate cup are attached to a closure plate 47 sealing the outer end of a pocket 48 opening into the manifold 11 or riser 10, so that the assembly is subjected to the mixture temperature and the outer sheath is expansible in response to increased suction in the manifold. Because of its greater size the outer sheath 45 can be made relatively stiffer than the inner sheath 28 so that increases in temperature will first collapse the inner sheath to vary the position of the heat valve. The larger size of the outer sheath renders it more responsive to a given degree of manifold suction and thus overcomes the increased initial stiffness thereof so that the outer sheath expands under increased suction, providing more space for the thermostatic fluid and thus nullifying or reducing the responsiveness of the assembly to temperature increases. Accordingly, at higher suctions a higher temperature will be required to reduce the flow of exhaust gases through the heating jacket 12.

The further modification shown in Figs. 5 and 6, utilizes an electrical solenoid or magnet 50 the armature 51 of which operates the rod 26, as in the previously described embodiments, to turn the damper 16 into a vertical position when the desired manifold operating conditions have been reached. The solenoid is energized from any suitable source of electrical energy as by a battery 52, one terminal of which is grounded by a wire 53, the other terminal being connected by a wire 54 to the solenoid and thence by a wire 55 to a terminal 56 which is adapted to be grounded by the device of this invention to complete the solenoid circuit and thus cut off the supply of heat to the jacket 12.

The temperature and pressure responsive device controlling the closing of the solenoid circuit is located in a pocket 57 formed in the wall of the intake manifold 11 and comprises corrugated diaphragms 58 separated by a spacer 59, the whole being assembled against the walls of the pocket by a cover 60, carrying the terminal 56 which is adjustably mounted in an insulated bushing 61. The space between the diaphragms is filled with a thermostatically responsive fluid 62. The outer diaphragm carries a central plug 63 aligned with the terminal 56 and making electrical contact therewith upon an outward bowing of the diaphragm due to increased vapor pressures acting thereagainst, due either to expansion and vaporization of the liquid or to an increase in pressure in the manifold which would push the inner diaphragm outwardly. In actual practice the two diaphragms 58 assume the position shown in Fig. 6 under conditions of atmospheric pressure and normal temperatures inside and outside the manifold, corresponding to a stopped engine. Upon starting the engine the manifold pressure drops below atmospheric causing some inward movement of both diaphragms until an increase in temperature causes expansion or vaporization of the thermostatic fluid whereupon the outer diaphragm returns to normal or even bows outwardly according to the temperature effect together with the degree of suction acting to bow the inner diaphragm inwardly. It will thus be seen that an increased manifold temperature will be required to close the solenoid circuit at high manifold suctions, in other words, a higher temperature is required as the absolute pressure in the manifold decreases.

The cover 60 is provided with a small vent 65 to assure free movement of the diaphragms.

It will thus be seen that in each of the illustrated embodiments of this invention, I have provided a thermostatic heat control the operating temperature of which is variable in response to varying operating conditions as evidenced by changed manifold suction and in which the heat control is modulated by direct action of the thermally responsive elements.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. An intake manifold heat control system for internal combustion engines comprising means for heating the fuel and air mixture flowing through said intake manifold, a valve governing the supply of heat to said heating means, thermostatic means for positively opening and shutting said valve, and pressure sensitive means adapted to increase the effective operating temperature of said thermostatic means as the pressure decreases.

2. In the intake manifold of an internal combustion engine, a temperature and pressure sensitive device having two movable walls spaced to form a pocket therebetween, one of said walls being subject to the temperature and pressure of the manifold, the other wall being exposed to atmospheric pressure, a thermostatic fluid in the pocket between said walls, and means associated with said other wall to operate a valve in the exhaust system of said engine.

3. An intake manifold heat control system for internal combustion engines comprising means for heating the fuel and air mixture flowing through said intake manifold, a valve governing the supply of heat to said heating means, an electrical circuit including a solenoid for operating said valve, a temperature and pressure sensitive device having two movable walls, one wall being subject to the pressure and temperature of the intake manifold, the other wall being exposed to atmospheric pressure, and means associated with said other walls for governing said electrical circuit.

4. An intake manifold heat control system for internal combustion engines comprising means for heating the fuel and air mixture flowing through said intake manifold, a valve governing the supply of heat to said heating means, an electrical circuit including a solenoid for operating said valve, a temperature and pressure sensitive device having two movable walls spaced to form a pocket therebetween, one wall being subject to the pressure and temperature of the intake manifold, the other wall being exposed to atmospheric pressure a thermostatic fluid in the pocket between said walls, and means associated with said other wall for governing said electrical circuit.

In testimony whereof I have hereunto subscribed my name at Flint, Genesee county, Michigan.

FREDERICK PURDY.